(12) United States Patent
Yasuda et al.

(10) Patent No.: US 7,618,092 B2
(45) Date of Patent: Nov. 17, 2009

(54) SEAT COVERING STRUCTURES

(75) Inventors: Ryo Yasuda, Kariya (JP); Kunio Nishiyama, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/269,202

(22) Filed: Nov. 12, 2008

(65) Prior Publication Data

US 2009/0121530 A1    May 14, 2009

(30) Foreign Application Priority Data

Nov. 14, 2007    (JP) ............... 2007-295353

(51) Int. Cl.
*A47C 31/00* (2006.01)
(52) U.S. Cl. .................. 297/224; 297/228.11
(58) Field of Classification Search ................. 297/224, 297/228.13, 218.2, 228.11
See application file for complete search history.

(56) References Cited

U.S. PATENT DOCUMENTS

| 1,970,820 | A | * | 8/1934 | Scheellkopf ................. 297/224 |
| 2,183,828 | A | * | 12/1939 | Trubitz ....................... 297/224 |
| 2,627,303 | A | | 2/1953 | Bard |
| 2,793,683 | A | * | 5/1957 | Trubitt ....................... 297/224 |
| 4,019,776 | A | | 4/1977 | Takamatsu |
| 4,036,524 | A | * | 7/1977 | Takamatsu ............... 297/219.1 |
| 5,820,214 | A | | 10/1998 | Bessette et al. |

FOREIGN PATENT DOCUMENTS

| FR | 2666974 A1 | 3/1992 |
| FR | 2781733 A1 | 2/2000 |
| JP | 1-119551 U | 8/1989 |

OTHER PUBLICATIONS

English language Abstract of FR 2781733 A1 (Feb. 4, 2000).
English language Abstract of FR 2666974 A1 (Mar. 27, 1992).

* cited by examiner

*Primary Examiner*—Milton Nelson, Jr.
(74) *Attorney, Agent, or Firm*—Greenblum & Bernstein P.L.C.

(57) ABSTRACT

A seat covering structure for covering a seat having a covering member may include a detachable seat cover. The detachable seat cover includes a seat cover body that is shaped to cover an outer surface of the seat, and at least one elastic band that is attached to a rear surface of the seat cover body. The at least one elastic band is arranged and constructed to be stretched so as to follow the outer surface of the seat when the seat cover body is applied to the seat. The seat cover body is arranged and constructed to follow the outer surface of the seat with the at least one elastic band when the at least one elastic band is stretched.

8 Claims, 3 Drawing Sheets

SEAT COVERING STRUCTURES

This application claims priority to Japanese patent application serial number 2007-295353, the contents of which are incorporated herein by reference.

BACKGROUND OF THE INVENTION

1. Field of the Invention

The present invention relates to seat covers of seats (vehicle seats) and covering structures for covering the seats using the seat covers. More particularly, the present invention relates to detachable seat covers of seats and covering structures for covering the seats using the detachable seat covers.

2. Description of Related Art

A covering structure for covering a seat (a seat back and a seat cushion) using a detachable seat cover is already known. Such a seat covering structure is taught, for example, by Japanese Laid-Open Utility Model Publication Number 1-119551. In this structure, hook and loop fasteners are used. That is, first fastener elements of the hook and loop fasteners are attached to peripheral portions of the seat cover. Conversely, second fastener elements of the hook and loop fasteners that are engageable with the first fastener elements are attached to the seat. The first and second fastener elements may preferably be positioned so as to correspond to each other. When the seat cover is applied to the seat, the first and second fastener elements engage with each other. As a result, the seat cover can be detachably attached to the seat. Thus, the seat can be covered with the seat cover.

Also, some of the first fastener elements are attached to substantial portions (central portions) of the seat cover. Similarly, some of the second fastener elements are attached to corresponding substantial portions of the seat. The first and second fastener elements may preferably be positioned so as to correspond to each other. The first and second fastener elements thus positioned engage with each other when the seat cover is applied to the seat, so that the seat cover can be reliably or accurately attached to the seat while the seat cover suitably follows a three-dimensional shape of the seat.

However, if the first and second fastener elements are not accurately positioned, the seat cover cannot be reliably or accurately attached to the seat, so that crinkling and waviness can be formed on the seat cover. As a result, it can be uncomfortable to sit on the seat. Therefore, in the known structure, the first and second fastener elements must be accurately positioned on the seat cover and the seat so as to correspond to each other when the seat cover is applied to the seat. However, generally speaking, it is difficult to accurately position the first and second fastener elements on the seat cover and the seat.

Further, when the seat cover is not attached to the seat (i.e., when the seat cover is detached from the seat), the second fastener elements attached to the seat can be exposed or uncovered. This may lead to an inferior appearance of the seat.

BRIEF SUMMARY OF THE INVENTION

For example, in one aspect of the present invention, a seat covering structure for covering a seat having a covering member may include a detachable seat cover. The detachable seat cover includes a seat cover body that is shaped to cover an outer surface of the seat, and at least one elastic band that is attached to a rear surface of the seat cover body. The at least one elastic band is arranged and constructed to be stretched so as to follow the outer surface of the seat when the seat cover body is applied to the seat. The seat cover body is arranged and constructed to follow the outer surface of the seat with the at least one elastic band when the at least one elastic band is stretched.

According to the seat covering structure thus constructed, the seat cover body (the seat cover) can be attached to the seat without directly engaging the rear surface of the seat cover body with the outer surface of the seat. Therefore, the seat cover can be easily attached to the seat.

Further, due to the elastic band, the seat cover body can be attached to the seat while the seat cover body suitably follows the outer surface of the seat. Therefore, the seat cover can be reliably or accurately attached to the seat without producing crinkling and waviness on the seat cover body. As a result, the seat can be very comfortable to sit.

Also, it is not necessary to provide attachment members to the outer surface of the seat in order to engage the rear surface of the seat cover body with the outer surface of the seat. Therefore, even if the seat cover is not attached to the seat (i.e., even if the seat cover body is detached from the seat), the seat can have a good appearance.

In one embodiment, the at least one elastic band may include a pair of elastic bands, which are positioned so as to extend along both sides of a depressed surface portion formed in the outer surface of the seat when the seat cover body is attached to seat.

In another embodiment, the detachable seat cover may include a fastening device in order to fixedly attach the seat cover body to the seat. The fastening device may preferably be composed of a first fastening device and a second fastening device that are respectively made of slide fasteners.

Other objects, features and advantages of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

A detailed representative embodiment of the present invention is shown in FIG. 1 to FIG. 4.

Figure 1:
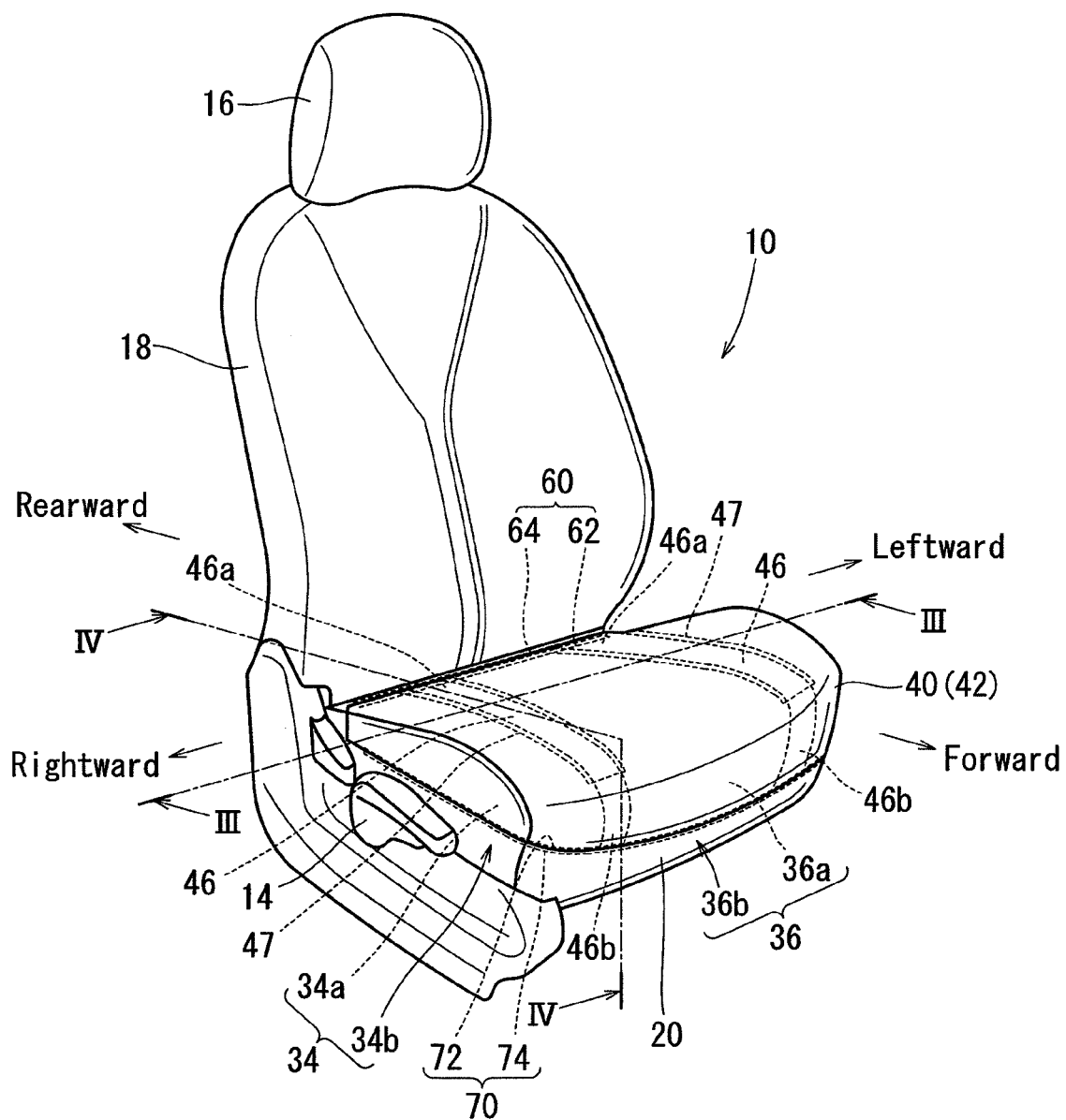
FIG. 1 is a perspective view of a seat, in which a seat cover according to a representative embodiment of the present invention is attached thereto.

As shown in FIG. 1, a representative vehicle seat 10 may preferably be arranged as a driver seat of a vehicle and include a seat back 18 having a head rest 16 and a seat cushion 20. A seat cover 40 is detachably attached to the seat 10. As will be recognized, in the embodiment, the seat cover 40 is exemplified as a cushion cover that is attached to the seat cushion 20.

Figure 2:
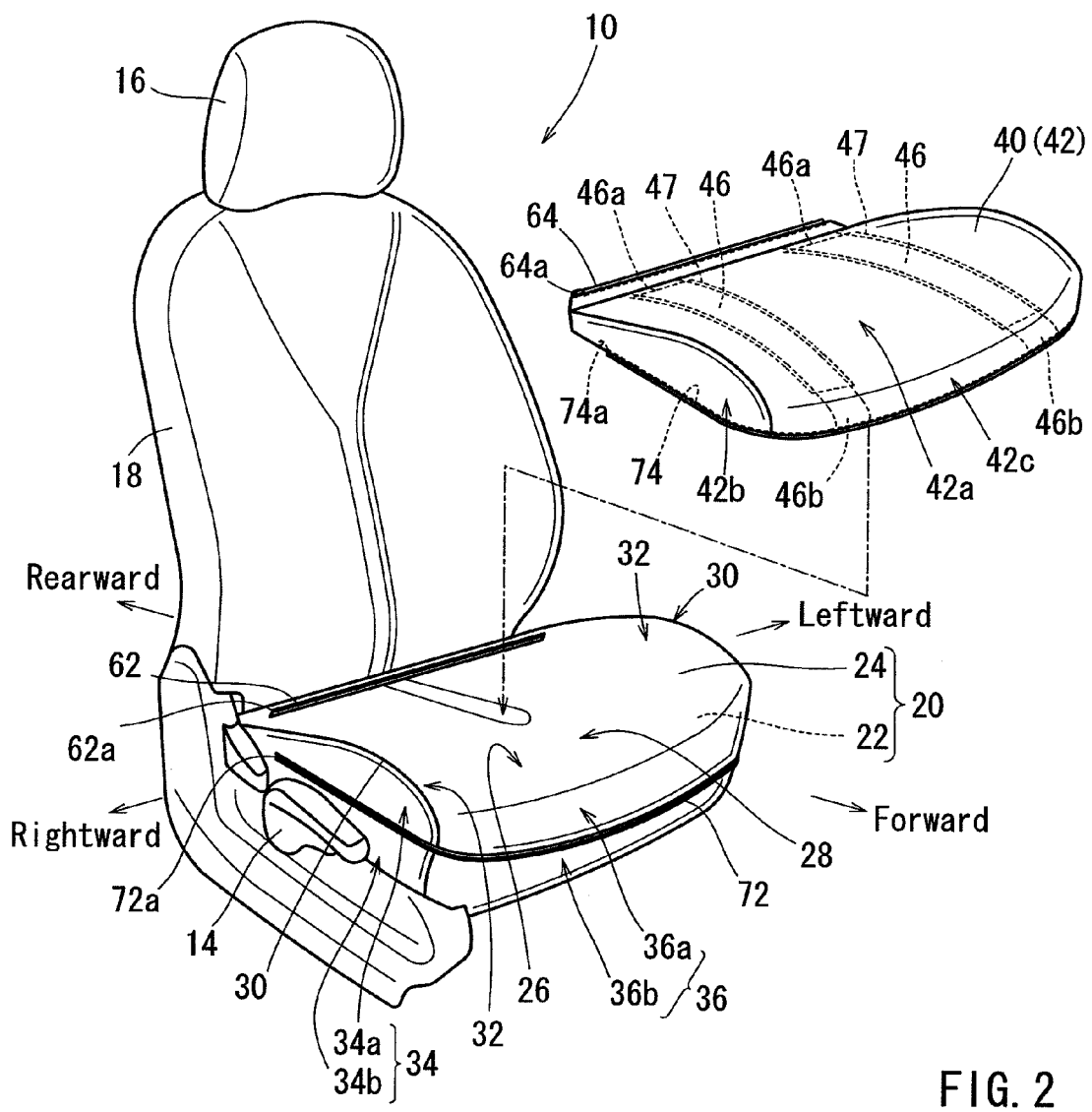
FIG. 2 is a perspective view of the seat, which illustrate a condition in which the seat cover is detached from the seat.
Figure 3:
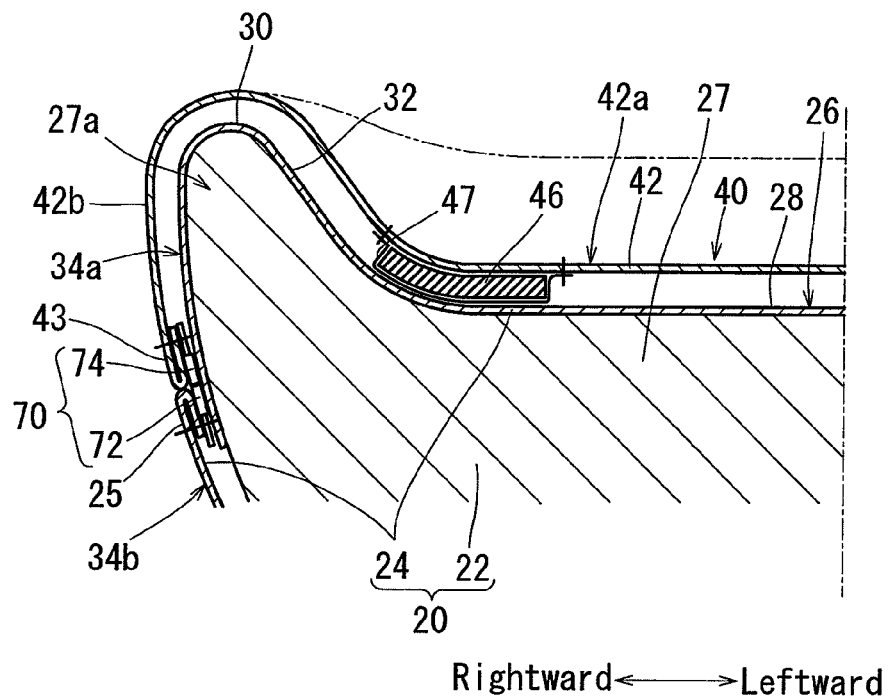
FIG. 3 is an enlarged partially cross-sectional view taken along line III-III in FIG. 1.
Figure 4:
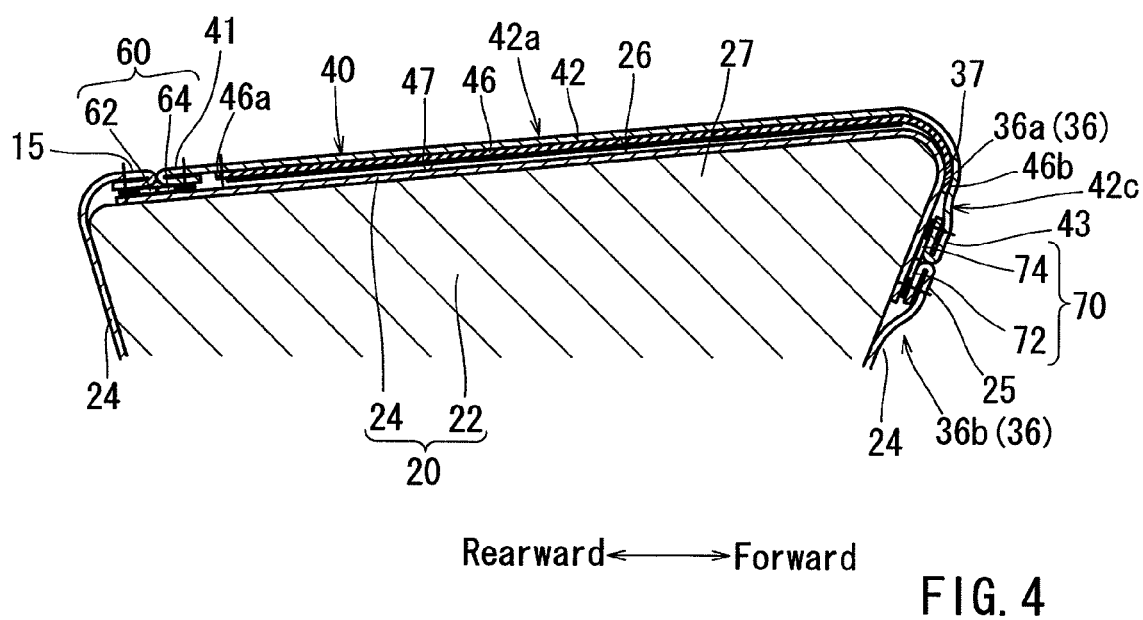
FIG. 4 is a cross-sectional view taken along line IV-IV in FIG. 1.

Before describing the seat cover 40, construction of the seat cushion 20 of the seat 10 will be described. As shown in FIG. 2, the seat cushion 20 may preferably be constituted of a cushion pad 22 and a covering member 24 attached to the cushion pad 22. The cushion pad 22 may preferably have a special three-dimensional shape. That is, as best shown in FIG. 3, the cushion pad 22 may preferably have a depressed central portion 27 and upwardly protruded side portions 27a. Conversely, as shown in FIGS. 3 and 4, the covering member 24 is arranged and constructed to closely follow the shape of the cushion pad 22 so as to have a three-dimensional shape corresponding to the three-dimensional shape of the cushion pad 22. Therefore, as shown in FIGS. 2 and 3, the seat cushion 20 thus constructed can have a three-dimensional shape corresponding to the shape of the cushion pad 22. The seat cushion 20 (the covering member 24) may preferably have an (three-dimensional) outer surface. The outer surface of the seat cushion 20 may preferably include a depressed sitting surface 26 (a depressed surface portion) having a flattened central surface portion 28, upwardly protruded side top surfaces 30 (a protruded surface portion), inclined side transition surfaces 32 that continuously extend from the sitting surface 26 to the top surfaces 30, side surfaces 34 that extend downwardly from the top surfaces 30, and a front surface 36 (a turned surface portion) that extends downwardly from a front periphery of the sitting surface 26. Further, as shown in FIG. 4, an upper surface of the central portion 27 of the cushion pad 22 may preferably inclined rearwardly such that the sitting surface 26 of the seat cushion 20 can be gradually lowered rearwardly.

As best shown in FIG. 2, the seat cover 40 is composed of a seat cover body 42 and a pair of elastic bands (rubber bands) 46. The seat cover body 42 may preferably be shaped to substantially correspond to the three-dimensional shape (i.e., the three-dimensional outer surface) of the seat cushion 20 so as to cover the sitting surface 26, the side top surfaces 30, the side transition surfaces 32, the upper side surfaces 34a and the upper front surface 36a of the seat cushion 20. Therefore, the seat cover body 42 is shaped so as to include a curved upper portion 42a (which corresponds to the sitting surface 26, the side top surface 30 and the side transition surfaces 32), vertical side portions 42b (which correspond to the upper side surfaces 34a) and a vertical front portion 42c (which corresponds to the upper front surface 36a). Further, the seat cover body 42 may preferably be formed by sewing together a plurality of pieces of a fabric sheet. The fabric sheet may preferably be composed of a woven fabric (not shown) and a thin sponge layer (not shown) adhered to a rear surface of the woven fabric. The elastic bands 46 may preferably be attached to a rear surface of the seat cover body 42 so as to extend in a forward and rearward direction of the seat back 20 (the seat 10). In particular, as shown in FIG. 3, a pair of fabric tapes are sewed on the rear surface of the seat cover body 42 such that a pair of elongated insertion sheaths 47 are formed therealong. The elastic bands 46 are respectively inserted into the elongated insertion sheaths 47. Further, rear end portions 46a of the elastic bands 46 inserted into the elongated insertion sheaths 47 are respectively sewed on a rear end portion of the seat cover body 42 (the seat cover body upper portion 42a). Conversely, front end portions 46b of the elastic bands 46 are respectively sewed on a front end portion of the seat cover body 42 (the seat cover body front portion 42c).

The elastic bands 46 thus attached are capable of stretching and contracting in the forward and rearward direction of the seat 10. Further, as shown in FIG. 3, the elastic bands 46 (the insertion sheaths 47) are respectively positioned so as to extend along the side transition surfaces 32 of the seat cushion 20 (i.e., along both sides of the sitting surface 26 of the seat cushion 20) when the seat cover 40 is attached to seat cushion 20.

Each of the elastic bands 46 may preferably have a length (an original length) shorter than a distance between a first position on the seat cushion 20 corresponding to the rear end portion 46a and a second position on the seat cushion 20 corresponding to the front end portion 46b. In other words, each of the elastic bands 46 may preferably have a length shorter than a distance between the rear end portion of the seat cover body 42 on which the rear end portions 46a of the elastic bands 46 are sewed and the front end portion of the seat cover body 42 on which the front end portions 46b of the elastic bands 46 are sewed. Therefore, when the seat cover 40 is not applied to the seat cushion 20, each of the elastic bands 46 is contracted to the original length. As a result, the seat cover body 42 can be partially gathered up along the contracted elastic bands 46. Conversely, when the seat cover 40 is applied to the seat cushion 20, each of the elastic bands 46 can be stretched to an elongated length. As a result, the seat cover body 42 can be expanded to follow the shape of the seat cushion 20 with the elastic bands 46.

As shown in FIG. 1, the seat cover 40 can be fixed to the seat cushion 20 via a first slide fastener 60 (a first fastening device) and a second slide fastener 70 (a second fastening device). The first fastener 60 is composed of a pair of opposed fastener strips 62 and 64 and a slide member 64a having a finger grip (not shown). The second fastener 70 is composed of a pair of opposed fastener strips 72 and 74 and a slide member 74a having a finger grip (not shown). Each of the fastener strips 62, 64, 72 and 74 is composed of a cloth strip having a series of metal or plastic teeth. Conversely, the slide member 64a and 74a is slidably attached to the fastener strips 64 and 74. As will be recognized, upon sliding the slide member 64a and 74a after engaging the fastener strips 62 and 72, the teeth of the fastener strips 62, 64, 72 and 74 engages with each other, so that the slide fasteners 60 and 70 can be fastened. Further, in this embodiment, each of the fastener strips 64 and 74 having the slide member 64a and 74a will be referred to as a male fastener strip. Conversely, each of the fastener strips 62 and 72 will be referred to as a female fastener strip.

As shown in FIGS. 2 and 4, the female fastener strip 62 (a first fastener element) of the first slide fastener 60 is stitched on the seat 10 (the seat cushion 20). As best shown in FIG. 2, the female fastener strip 62 may preferably be positioned on the sitting surface 26 of the seat cushion 20 so as to transversely extend along a rear end periphery thereof (i.e., along a rear end portion (of the outer surface) of the seat cushion 20). In addition, as shown in FIG. 4, the female fastener strip 62 may preferably be stitched on the seat cushion 20 so as to not protrude from a rear folded portion 15 of the covering member 24 of the seat cushion 20 (i.e., so as to be covered by the folded portion 15). As will be appreciated, the folded portion 15 may preferably be formed by cutting and folding of the covering member 24 along the rear end periphery thereof.

Further, as shown in FIGS. 2 and 3, the female fastener strip 72 (a first fastener element) of the second slide fastener 70 is stitched on the seat cushion 20. As best shown in FIG. 2, the female fastener strip 72 is positioned on the side surfaces 34 and the front surface 36 of the covering member 24 so as to extend therealong (i.e., along a side-to-front portion (of the outer surface) of the seat cushion 20). Further, the female fastener strip 72 may preferably be positioned so as to divide the side surfaces 34 and the front surface 36 to upper and lower side surfaces 34a and 34b and upper and lower front surfaces 36a and 36b. As will be appreciated, the female fastener strip 72 may preferably be positioned so as to not interfere with a lever 14 that is capable of controlling a tilting angle of the seat back 18. In addition, as shown in FIGS. 3 and 4, the female fastener strip 72 may preferably be stitched on the seat cushion 20 so as to not protrude from a side-to-front folded portion 25 of the covering member 24 of the seat cushion 20 (i.e., so as to be covered by the folded portion 25). As will be appreciated, the folded portion 25 may preferably be formed by cutting and folding the covering member 24 along a substantially central portion of the side and front surfaces 34 and 36 thereof.

As shown in FIGS. 2 and 4, the male fastener strip 64 (a second fastener element) of the first slide fastener 60 is stitched on the seat cover body 42 (the upper portion 42a). As described above, the first male fastener strip 64 has the slide member 64a. As best shown in FIG. 2, the male fastener strip 64 may preferably be positioned on a rear end periphery of the seat cover body 42 so as to transversely extend therealong. The male fastener strip 64 may preferably be positioned so as to correspond to the female fastener strip 62 attached to the seat cushion 20 when the seat cover 40 is applied to the seat cushion 20. In addition, as shown in FIG. 4, the male fastener strip 64 may preferably be stitched on the seat cover body 42 so as to not protrude from a rear folded portion 41 of the seat cover body 42 (i.e., so as to be covered by the rear folded portion 41). As previously described, upon sliding the slide member 64a after engaging the female fastener strip 62, the female and male fastener strips 62 and 64 engages with each other, so that the first slide fastener 60 can be fastened. Further, the slide member 64a may preferably be arranged and constructed to engage the female fastener strip 62 at a (right) end portion 62a (FIG. 2) that is closer to a door opening (not shown) of the vehicle.

Thus, the male fastener strip 64 is stitched on the seat cover body 42 so as to be covered with the rear folded portion 41 of the seat cover body 42. In addition, as previously described, the female fastener strip 62 is stitched on the seat cushion 20 so as to be covered with the folded portion 15 of the covering member 24 of the seat cushion 20. Therefore, when the first slide fastener 60 is fastened, the female and male fastener strips 62 and 64 can be prevented from being exposed. That is, the female and male fastener strips 62 and 64 can be hidden from view.

As shown in FIGS. 2 and 3, the male fastener strip 74 (a second fastener element) of the second slide fastener 70 is stitched on the seat cover body 42 (the side and front portions 42b and 42c). As described above, the male fastener strip 74 has the slide member 74a. As best shown in FIG. 2, the male fastener strip 74 may preferably be positioned so as to extend from the periphery of the seat cover body front portion 42c to peripheries of the seat cover body side portions 42b (i.e., front and side peripheries of the seat cover body 42). In addition, as shown in FIGS. 3 and 4, the male fastener strip 74 may preferably be stitched on the seat cover body 42 so as to not protrude from a folded portion 43 of the seat cover body 42. Also, the male fastener strip 74 may preferably be positioned so as to correspond to the female fastener strip 72 attached to the seat cushion 20 when the seat cover 40 is applied to the seat cushion 20. As described previously, upon sliding the slide member 74a after engaging the female fastener strip 72, the female and male fastener strips 72 and 74 engages with each other, so that the second slide fastener 70 can be fastened. Further, the slide member 74a may preferably be arranged and constructed to engage the female fastener strip 72 at a (right) end portion 72a (FIG. 2) that is closer to the door opening of the vehicle.

Thus, the male fastener strip 74 is stitched on the seat cover body 42 so as to be covered with the folded portion 43 of the seat cover body 42. In addition, as previously described, the female fastener strip 72 is stitched on the seat cushion 20 so as to be covered with the folded portion 25 of the covering member 24 of the seat cushion 20. Therefore, when the second slide fastener 70 is fastened, the female and male fastener strips 72 and 74 can be prevented from being exposed. That is, the female and male fastener strips 72 and 74 can be hidden from view.

In order to attach the seat cover 40 to the seat cushion 20, first, the seat cover 40 is positioned on the seat cushion 20. Thereafter, the seat cover body 42 is applied to the seat cushion 20 while stretching the elastic bands 46 in the forward and rearward direction of the seat 10. Thus, the seat cover 40 is attached to the seat cushion 20 while the elastic bands 46 are stretched so as to follow the outer surface (the sitting surface 26) of the seat cushion 20. At this time, the elastic band 46 can extend beyond the sitting surface 26 of the seat cushion 20 to the upper front surface 36a (the front surface 36) of the seat cushion 20. Further, when the seat cover body 42 is applied to the seat cushion 20, the seat cover body 42 may preferably be positioned such that the male fastener strips 64 and 74 stitched on the seat cover body 42 can suitably correspond to the female fastener strips 62 and 72 stitched on the seat cushion 20. Next, the slide members 64a and 74a attached to the male fastener strips 64 and 74 are respectively engaged with the female fastener strips 62 and 72. Subsequently, the slide members 64a and 74a are slid so as to engage the female fastener strips 62 and 72 with the male fastener strips 64 and 74 over the entire length thereof, thereby fastening the first and second slide fasteners 60 and 70. Thus, the seat cover 40 is fixedly attached to the seat cushion 20.

When the seat cover 40 is attached to the seat cushion 20, the rear end portions 46a of the elastic bands 46 can be positioned at the rear end periphery of the sitting surface 26 of the seat cushion 20. Conversely, the front end portions 46b of the elastic bands 46 can be positioned at the upper front surface 36a (the front surface 36) of the seat cushion 20. Therefore, the elastic bands 46 can be maintained in a condition in which the elastic bands 46 are folded or turned along a curved front transition surface 37 between the sitting surface 26 and the upper front surface 36a. That is, the elastic bands 46 can closely contact the front transition surface 37 of the seat cushion 20 while suitably pressing the front transition surface 37. Thus, the elastic bands 46 can be maintained in a condition in which the elastic bands 46 are stretched so as to follow the outer surface (the sitting surface 26, the transition surface 37 and the upper front surface 36a) of the seat cushion 20.

As described above, the elastic bands 46 are inserted into the elongated insertion sheaths 47 that extend along the rear surface of the seat cover body 42. Therefore, the seat cover body 42 can suitably follow the outer surface (in particular, the sitting surface 26) of the seat cushion 20 with the elastic band 46.

As will be recognized, if the elastic bands 46 are not attached to the seat cover body 42, as shown by broken lines in FIG. 3, the seat cover body 42 cannot suitably follow the outer surface (the sitting surface 26) of the seat cushion 20

(i.e., the seat cover body 42 can be spaced from the sitting surface 26) because the seat cover body 42 can probably be pulled up by means of the side top surfaces 30 of the seat cushion 20. However, in this embodiment, the elastic bands 46 are attached to the seat cover body 42 so as to extend along the side transition surfaces 32 of the seat cushion 20 (i.e., along both sides of the sitting surface 26 of the seat cushion 20) when the seat cover 40 is attached to seat cushion 20. Therefore, the seat cover body 42 can be suitably pulled down by the stretched elastic bands 46, so as to reliably follow the outer surface (the sitting surface 26) of the seat cushion 20 with the elastic bands 46. Thus, the seat cover body 42 can be prevented from being spaced from the sitting surface 26, so as to be suitably attached to the seat cushion 20.

Further, in this embodiment, the seat cover 40 can be attached to the seat cushion 20 after the seat cover 40 can be suitably positioned on the seat cushion 20. In such a case, first, the seat cover body 42 is positioned on the seat cushion 20 such that the male fastener strips 64 and 74 stitched on the seat cover body 42 can respectively correspond to the female fastener strips 62 and 72 stitched on the seat cushion 20. Thereafter, the slide member 64a attached to the male fastener strip 64 is engaged with the female fastener strip 62. Subsequently, the slide member 64a is slid so as to engage the female fastener strip 62 with the male fastener strip 64, thereby fastening the first slide fastener 60. In this condition, the seat cover body 42 is applied to the seat cushion 20 while stretching the elastic bands 46 in the forward and rearward direction of the seat 10. Thus, the seat cover 40 can be attached to the seat cushion 20 while the elastic bands 46 are stretched. Next, the slide member 74a attached to the male fastener strip 74 is engaged with the female fastener strip 72. The slide member 74a is then slid so as to engage the female fastener strip 72 with the male fastener strip 74, thereby fastening the second slide fastener 70. Thus, the seat cover 40 can be fixedly attached to the seat cushion 20.

According to the present embodiment, the seat cover body 42 (the seat cover 40) can be attached to the seat cushion 20 by elastic forces of the elastic bands 46. In other words, the seat cover body 42 (the seat cover 40) can be attached to the seat cushion 20 without directly engaging the rear surface of the seat cover body 42 with the outer surface of the seat cushion 20. Therefore, the seat cover 40 can be easily attached to the seat cushion 20.

Further, due to the elastic bands 46, the seat cover 40 can be attached to the seat cushion 20 while suitably following the outer surface of the seat cushion 20. Therefore, the seat cover 40 can be reliably or accurately attached to the seat cushion 20 without producing crinkling and waviness on the seat cover body 42. As a result, the seat 10 (the seat cushion 20) can be comfortable to sit on.

Also, no attachment member is provided to the sitting surface 26 and the side transition surfaces 32 of the seat cushion 20. Therefore, even if the seat cover 40 is not attached to the seat cushion 20 (i.e., even if the seat cover body 40 is detached from the seat cushion 20), the seat cushion 20 can have a good appearance.

Further, as described above, the slide members 64a and 74a are respectively arranged and constructed to engage the female fastener strips 62 and 72 at the end portions 62a and 72a that are closer to the door opening of the vehicle. Therefore, the first and second slide fasteners 60 and 70 can be easily fastened via the door opening of the vehicle. That is, the seat cover 40 can be easily attached to the seat cushion 20 via the door opening of the vehicle.

In addition, the second slide fastener 70 cannot be exposed when it is fastened. Therefore, the second slide fastener 70 can be effectively prevented from scratching clothes of a passenger of the vehicle.

Naturally, various changes and modifications may be made to the present invention without departing from the scope of the invention. For example, the first fastener 60 can be arranged such that the finger grip of the slide member 64a cannot be exposed when the first fastener 60 is fastened. According to the first fastener 60 thus arranged, the slide member 64a can be effectively prevented from scratching the clothes of the passenger. In addition, the slide member 64a can be effectively prevented from generating noise and from interfering with the seat cover body 42 because the slide member 64a can be effectively prevented from vibrating or swinging while the vehicle is moving. As will be recognized, in this modified form, the first slide fastener 60 should be fastened before the seat cover body 42 is applied to the seat cushion 20.

Further, the number of the elastic bands 46 is not limited to two. That is, three or more elastic bands can be used, if necessary. Conversely, a single wide elastic band can be used.

Further, the seat cover body 42 can be formed from a stretch fabric sheet so as to be stretched with the elastic bands 46.

Further, the first and second slide fasteners 60 and 70 can respectively be replaced with hook and loop fasteners.

Further, the seat cover 40 can be constructed as a seat back cover or a head rest cover that are attached to the seat back 18 and the head rest 16.

What is claimed is:

1. A seat covering structure for covering a seat having a covering member, comprising:
   a detachable seat cover, wherein the detachable seat cover includes a seat cover body that is shaped to cover an outer surface of the seat, and
   a pair of elastic bands that are attached to a rear surface of the seat cover body,
   wherein the outer surface of the seat includes a depressed surface portion, the depressed surface portion having side transition surfaces and a central surface portion between the side transition surfaces,
   wherein the pair of elastic bands are configured to be stretched so as to follow the contours of the outer surface of the seat when the seat cover body is applied to the seat,
   wherein the seat cover body is configured to follow the contours of the outer surface of the seat with the pair of elastic bands when the pair of elastic bands are stretched,
   wherein each elastic band of the pair of elastic bands is positioned so as to extend along a respective side of the depressed surface portion of the seat outer surface when the seat cover body is attached to the seat, and
   wherein each elastic band of the pair of elastic bands is positioned so as to straddle at least a portion of a respective side transition surface and a portion of the central surface portion.

2. The seat covering structure as defined in claim 1, wherein the elastic bands are arranged and constructed to extend beyond the depressed surface portion to a turned surface portion that extends downwardly from the depressed surface portion.

3. The seat covering structure as defined in claim 1, wherein the seat cover body is shaped to substantially correspond to the outer surface of the seat, and wherein an insertion sheath is formed along the rear surface of the seat cover body and the at least one elastic band is inserted into the insertion sheath.

4. The seat covering structure as defined in claim 1, wherein the detachable seat cover further comprises a fastening device in order to fixedly attach the seat cover body to the seat.

5. The seat covering structure as defined in claim 4, wherein the seat comprises a seat cushion, wherein the seat cover body is shaped to substantially correspond to an outer surface of the seat cushion, wherein the fastening device comprises a first fastening device and a second fastening device, wherein the first fastening device is arranged and constructed to fasten the seat cover body to a rear end portion of the seat cushion, and wherein the second fastening device is arranged and constructed to fasten the seat cover body to a side-to-front portion of the seat cushion.

6. The seat covering structure as defined in claim 5, wherein the first and second fastening devices are respectively arranged to be covered with the seat covering member and the seat cover body.

7. The seat covering structure as defined in claim 5, wherein the first and second fastening devices respectively comprise slide fasteners.

8. A detachable seat cover for a seat having a covering member, comprising:
   a seat cover body that is shaped to cover an outer surface of the seat; and
   at least one elastic band that is attached to a rear surface of the seat cover body,
   wherein the outer surface of the seat includes a depressed surface portion, the depressed surface portion having side transition surfaces and a central surface portion between the side transition surfaces,
   wherein the at least one elastic band is configured to be stretched so as to follow the contours of the outer surface of the seat when the seat cover body is applied to the seat,
   wherein the seat cover body is configured to follow the contours of the outer surface of the seat with the at least one elastic band when the at least one elastic band is stretched, and
   wherein the at least one elastic band is positioned so as to straddle at least a portion of one of the side transition surfaces and a portion of the central surface portion.

* * * * *